(12) United States Patent
Dooley

(10) Patent No.: US 8,232,700 B2
(45) Date of Patent: Jul. 31, 2012

(54) MULTI-ROTOR ELECTRIC MACHINE

(75) Inventor: Kevin A. Dooley, Mississauga (CA)

(73) Assignee: Pratt & Whitney Canada Corp., Longueuil, CA (US)

( * ) Notice: Subject to any disclaimer, the term of this patent is extended or adjusted under 35 U.S.C. 154(b) by 345 days.

(21) Appl. No.: 12/340,210

(22) Filed: Dec. 19, 2008

(65) Prior Publication Data
US 2010/0156221 A1    Jun. 24, 2010

(51) Int. Cl.
*H02K 16/00* (2006.01)
*H02K 16/02* (2006.01)

(52) U.S. Cl. .......................... 310/114; 310/83; 310/113

(58) Field of Classification Search ................. 310/83, 310/113, 114
See application file for complete search history.

(56) References Cited

U.S. PATENT DOCUMENTS

| | | | |
|---|---|---|---|
| 1,292,592 A | 1/1919 | Ferris | |
| 1,785,965 A | 12/1930 | Major | |
| 2,463,349 A | 3/1949 | Baner | |
| 2,500,730 A | 3/1950 | Yonkers | |
| 3,168,665 A | 2/1965 | Holper | |
| 3,757,149 A * | 9/1973 | Holper | 310/114 |
| 4,274,023 A | 6/1981 | Lamprey | |
| 4,691,119 A | 9/1987 | McCabria | |
| 5,043,617 A | 8/1991 | Rostron | |
| 5,212,418 A * | 5/1993 | Mason | 310/114 |
| 5,534,737 A | 7/1996 | Nishimura | |
| 5,684,351 A * | 11/1997 | Elferich | 310/112 |
| 5,780,950 A * | 7/1998 | Yang | 310/114 |
| 5,814,913 A * | 9/1998 | Ojima et al. | 310/112 |
| 6,304,002 B1 | 10/2001 | Dehlsen et al. | |
| 6,727,629 B1 | 4/2004 | Soghomonian et al. | |
| 6,761,542 B2 * | 7/2004 | Ojima et al. | 417/410.4 |
| 6,844,643 B2 | 1/2005 | Aoshima | |
| 6,867,514 B2 * | 3/2005 | Fecera | 310/46 |
| 2001/0008354 A1* | 7/2001 | Minagawa | 310/113 |
| 2005/0029887 A1* | 2/2005 | Fecera | 310/156.32 |
| 2005/0140230 A1 | 6/2005 | Johnson et al. | |
| 2008/0012441 A1* | 1/2008 | Yang | 310/112 |
| 2008/0202466 A1* | 8/2008 | Webster | 123/239 |

FOREIGN PATENT DOCUMENTS

| | | |
|---|---|---|
| DE | 3234673 | 9/1982 |
| JP | 57083172 | 5/1982 |
| JP | 04322152 | 11/1992 |
| JP | 07163104 A * | 6/1995 |
| JP | 09046969 | 2/1997 |
| JP | 2001258217 A * | 9/2001 |
| WO | 2005069465 | 7/2005 |

* cited by examiner

*Primary Examiner* — Quyen Leung
*Assistant Examiner* — Alex W Mok
(74) *Attorney, Agent, or Firm* — Norton Rose Canada LLP

(57) ABSTRACT

Electric machines comprising a plurality of magnetized rotors, preferably including bi-pole magnets. The rotors are configured to drive and/or be driven by a common shaft, as for example by suitable configurations of gears. The rotors are magnetically indexed, in pairs, with respect to each other and to corresponding electrical windings, such that, when a current is passed through the one or more windings, the rotors provide phased rotary power to the common shaft; or, when torque is applied to the common shaft, a phased electrical output is provided to the windings.

20 Claims, 7 Drawing Sheets

MULTI-ROTOR ELECTRIC MACHINE

TECHNICAL FIELD

The application relates generally to electric machines, and more particularly to improved multiple-rotor electric machines such as motors and generators.

BACKGROUND OF THE ART

Multiple-rotor electric machines are known. Such machines are discussed, for example, in U.S. Patent Application Publication No. 2005/0140230 of Johnson et al.; in U.S. Pat. No. 5,534,737 to Nishimura; in German Patent Publication DE 3234673; and in Japanese Patent Number JP 09046969.

However, prior art multiple-rotor machines such as those discussed in the cited references are heavier and less powerful than necessary or desirable, and may provide relatively unsteady power output.

There is a need for lighter and more powerful electric machines, which are capable of outputting steady and stable power.

SUMMARY

The disclosure provides electric machines, and in particular improved multiple-rotor electric machines such as motors and generators. In various aspects, for example, the disclosure provides electric motors and generators having a plurality of magnetized rotors, which preferably include or are in the form of single bi-pole magnets (i.e., two-pole rotors). The rotors are configured to drive and/or be driven by a common shaft, as for example by suitable combinations and configurations of gears. The rotors are magnetically indexed, in pairs, with respect to each other and to corresponding electrical windings such that, when a current is passed through the one or more windings, the rotors provide phased rotary power to the common shaft; or, when torque is applied to the common shaft, a phased electrical output is provided to the windings.

As will be well understood by those skilled in the relevant arts, such machines can be operated as motors and/or as generators. In this application, the term generator includes both DC generators and AC alternators, and electric machines configured to output, when coupled with suitable combinations of rectifiers, capacitors, switches, etc., both AC and DC power.

Thus, in one aspect, the disclosure provides an electric motor comprising a plurality of magnetized rotors, which preferably comprise single bi-pole magnets, configured to drive a common shaft. The rotors are magnetically indexed, in pairs, with respect to corresponding electrical windings, such that, when a current is passed through the one or more rotor related windings, the rotors provide phased rotary power to the common shaft.

In a further aspect, the disclosure provides an electric generator comprising a plurality of magnetized rotors, which preferably comprise single bi-pole magnets, configured to be driven by a common shaft. The rotors are magnetically indexed, in pairs, with respect to corresponding electrical windings, such that, when a torque is applied to the common shaft, a phased current is produced in the one or more windings.

In a further aspect, the disclosure provides an electric generator comprising a plurality of magnetized rotors, which preferably comprise single bi-pole magnets, configured to be driven by a common shaft. The rotors are magnetically indexed, in pairs, with respect to corresponding electrical windings, such that, when a torque is applied to the common shaft, a phased current is produced in the one or more windings.

In further aspects, the disclosure provides electric machines having a plurality of flux paths (i.e., magnetic circuits) defined between pairs of rotors, each pair of rotors being associated with a shared stator. Respective pairs of rotors may further be associated with a single winding, shared by the pair. Such machines may be configured such that the flux paths statically created, or located, within the machine (i.e. do not rotate about the stator) while the electric machine is in operation.

For example, in various embodiments the disclosure provides electric machines comprising a plurality of bi-pole magnetized rotors configured to drive, or be driven by, a common shaft, the rotors provided in one or more multiples of six and magnetically indexed in adjacent pairs with respect to one or more electrical windings. Each rotor of a respective pair is indexed 180 degrees out of phase with its pair mate, and adjacent pairs of rotors are indexed relative to each other, such that when a current is passed through the one or more windings, the rotors provide phased rotary power to the common shaft; and/or such that when a torque is applied to the common shaft a phased electrical current is generated in the one or more windings.

In such embodiments, for example, three indexed pairs of bi-pole rotors may be provided, each pair phased at 120 degrees with respect to adjacent pairs. Or, as a further example, where six indexed pairs of bi-pole rotors are provided, each of the six rotor pairs may be phased at 60 degrees with respect to adjacent pairs.

In some embodiments, electrical machines according to the disclosure may comprise shared stators for respective pairs of index rotors.

Electrical machines according to the disclosure have been shown to provide surprising increases in power density. For example, in addition to the features described above, because the rotors may be relatively small in diameter, they may comprise magnets restrained by relatively thin, light containment sleeves. This allows, for example, the use of smaller, lighter, thinner magnets to produce the same output power, whether operated in the motor or generator mode; and an overall lighter and more powerful electric machine.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

Figure 1:
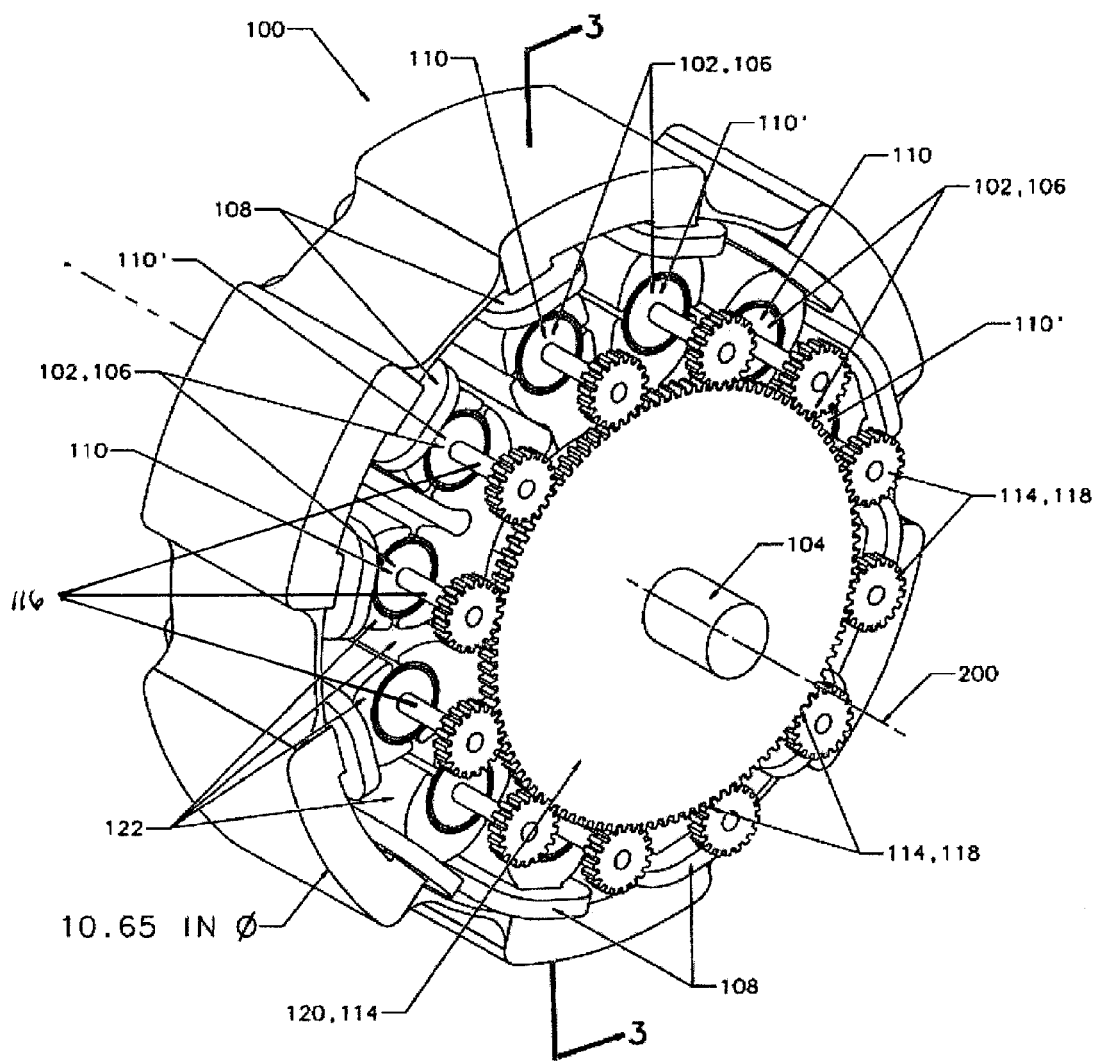
FIG. 1 is a schematic perspective view of portions of an embodiment of an electric machine in accordance with the disclosure.
Figure 2:
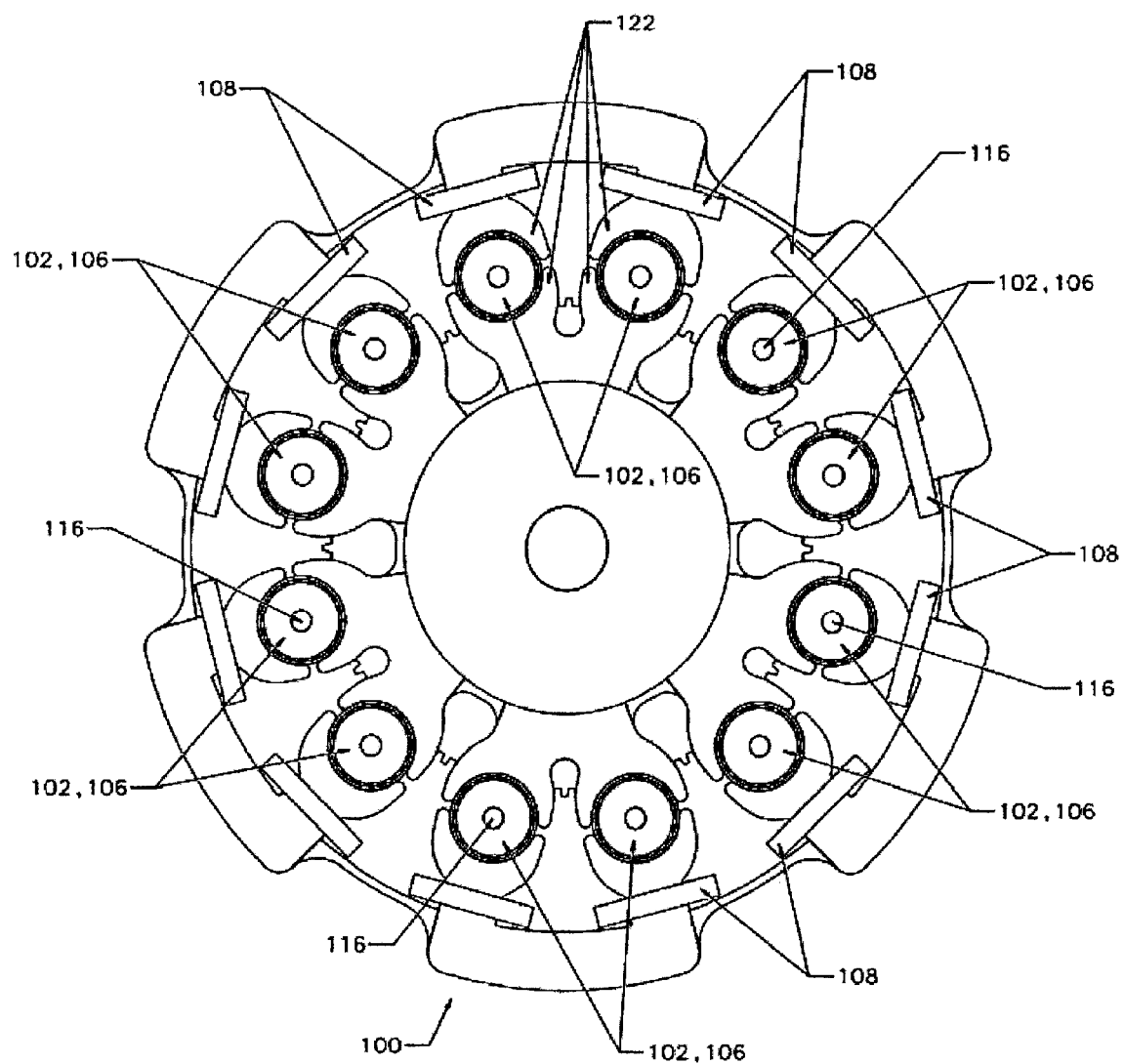
FIG. 2 is a schematic front cut-away view of portions of an embodiment of an electric machine in accordance with the disclosure.
Figure 3:
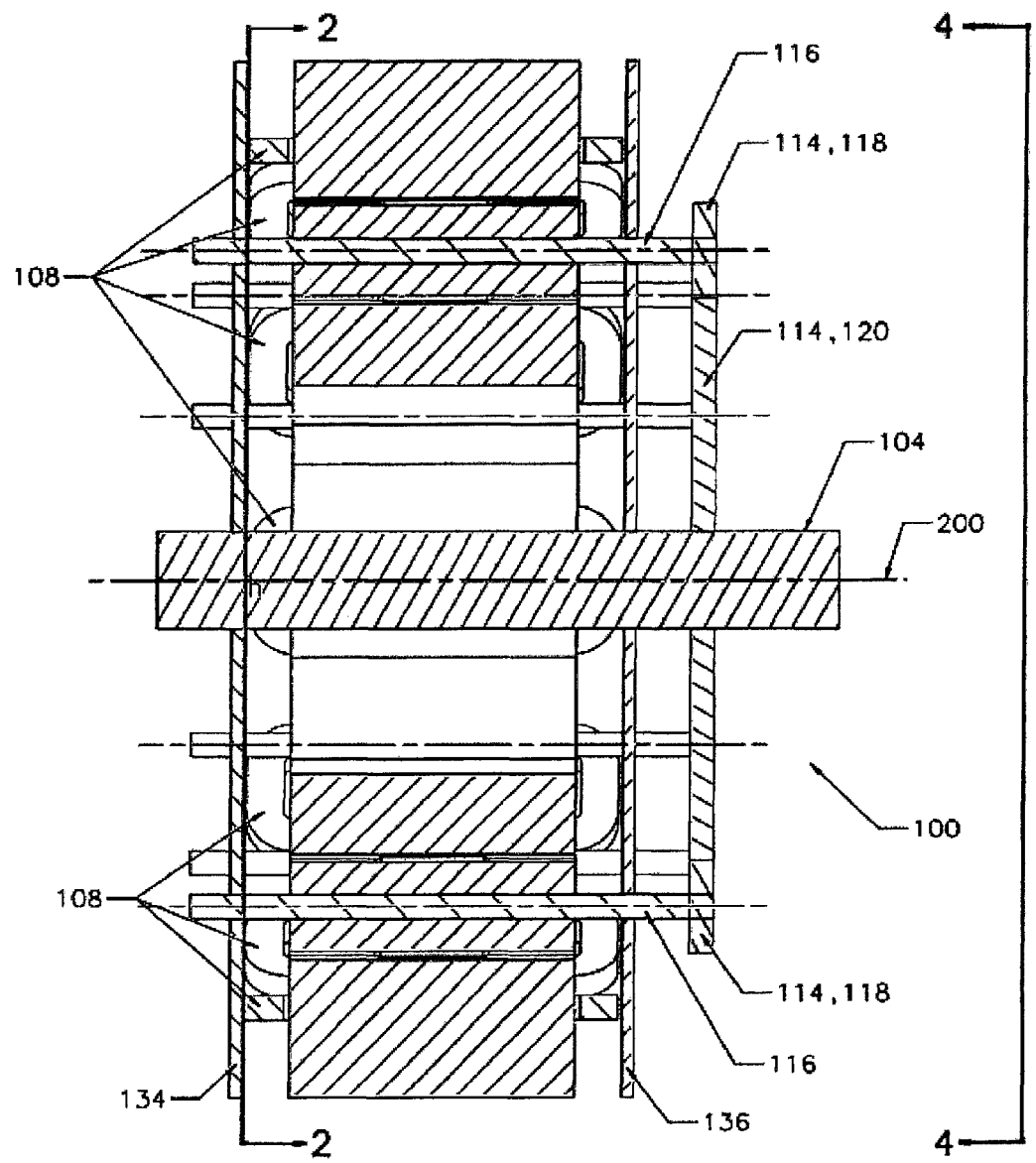
FIG. 3 is a schematic side partial cut-away view of a portion of an embodiment of an electric machine in accordance with the disclosure.

Various aspects of preferred embodiments of electric machines according to the disclosure are described through reference to the drawings.

FIGS. 1-7 provide schematic views of various aspects of one type of embodiment of an electric machine 100 in accordance with the disclosure. As illustrated, machine 100 comprises magnetic rotors 102, windings 108, stators 122, gears 114, and shaft 104. In the embodiment shown, machine 100 comprises a plurality of magnetic rotors 102, each configured to rotate about an independent rotor shaft 116 (see, for example, FIGS. 2 and 3). Each rotor shaft 116 is configured to, under the impetus of magnetic rotors 102, drive shaft 104 by means of gears 114 when machine 100 is operated as a motor and electric current is applied to windings 108. Alternatively, magnetic rotors 102 are configured to rotate, and thus cause the flow of electrical current in windings 108, when a torque is applied to shaft 104, so that machine 100 acts as a generator. Note that in FIG. 3 gears 114 are shown without teeth for the sake of clarity. Gears 114 may be provided in any suitable form, including for example in the form of toothless wheels engaged by friction.

In the embodiment shown, each rotor shaft 116 is supported by front and back plates 134 and 136 (FIG. 3), with suitable bearings, and is formed integral with or otherwise connected to a drive gear 114, 118, which is configured to engage a shaft gear 114, 120, which gear is formed integral with or otherwise connected to shaft 104, such that rotation of one or more of rotors 102 causes drive gear(s) 118 to drive shaft gear 120, and therefore shaft 104, into rotation—or vice-versa, depending upon the mode of operation. See, for example, FIGS. 1 and 4.

It can be advantageous to configure rotors 102 to operate in electro-magnetically independent pairs. That is, the rotors can be separated magnetically into pairs 106, such that there is no provision of magnetic material linking any two pairs 106 of rotors 102 together, the only links between separate rotor pairs 106 being the gears 114 or other mechanical coupling between them. The rotors 102 of a given pair 106 in such configurations can benefit from the provision of common magnetic circuit components, such as stators 122 and/or windings 108, as shown, for example, in FIGS. 6 and 7. Such configuration can significantly reduce the amount of magnetic material required for operation of the rotors, with corresponding cost and weight savings. For example, since the magnetic circuit for both the rotors in the pair is provided in common (see for example FIG. 5), the source of magnetic energy (the coil(s) 108) may also be common to both rotors 102, and as such shared by both rotors 102 of a pair 106 (see for example FIG. 7). This means that two rotors 102 of a pair 106 can be energized by a single coil 108 if desired, with a weight savings of on the order of approximately 10% in the weight of the overall machine. In other embodiments it may be advantageous to provide two coils for each pair, as shown for example in FIG. 6.

In the embodiment shown, each rotor 102 (as shown for example in FIG. 6) comprises one or more magnets 128 mounted on a shaft 116 and retained, particularly when rotating, by a containment sheath 126. Magnets 128 comprise north and south poles (denoted "N" and "S" respectively in FIGS. 4 and 6). In some embodiments, rotors 102 comprise single pairs of north and south poles, and may be referred to as bi-pole rotors. Moreover, rotors 102 are provided in pairs 106, comprising first rotors 102, 110 and second rotors 102, 110', indexed such that magnets 128 are mounted, and rotate, (a) as individual rotors 102, in a desired phase with respect to their pair mates 110, 110', and (b) by pairs 106, in a desired paired phase with respect to other pairs 106 and winding(s) 108.

It has been found that, when using paired sets 106 of bi-pole rotors 102 indexed as described herein, particular advantage may be gained by phasing rotors 102 within each pair 106 such that a first rotor 102, 110 of the pair is 180 degrees out of phase with its pair mate 102, 110'. It has been found that 180-degree phasing maximizes the utility of the flux paths 132 (as shown for example in FIG. 5) around the rotors 102, and therefore the weight efficiency of interactions between rotors 102 and windings 108 and the power available to be developed from the machine 100.

Figure 6:
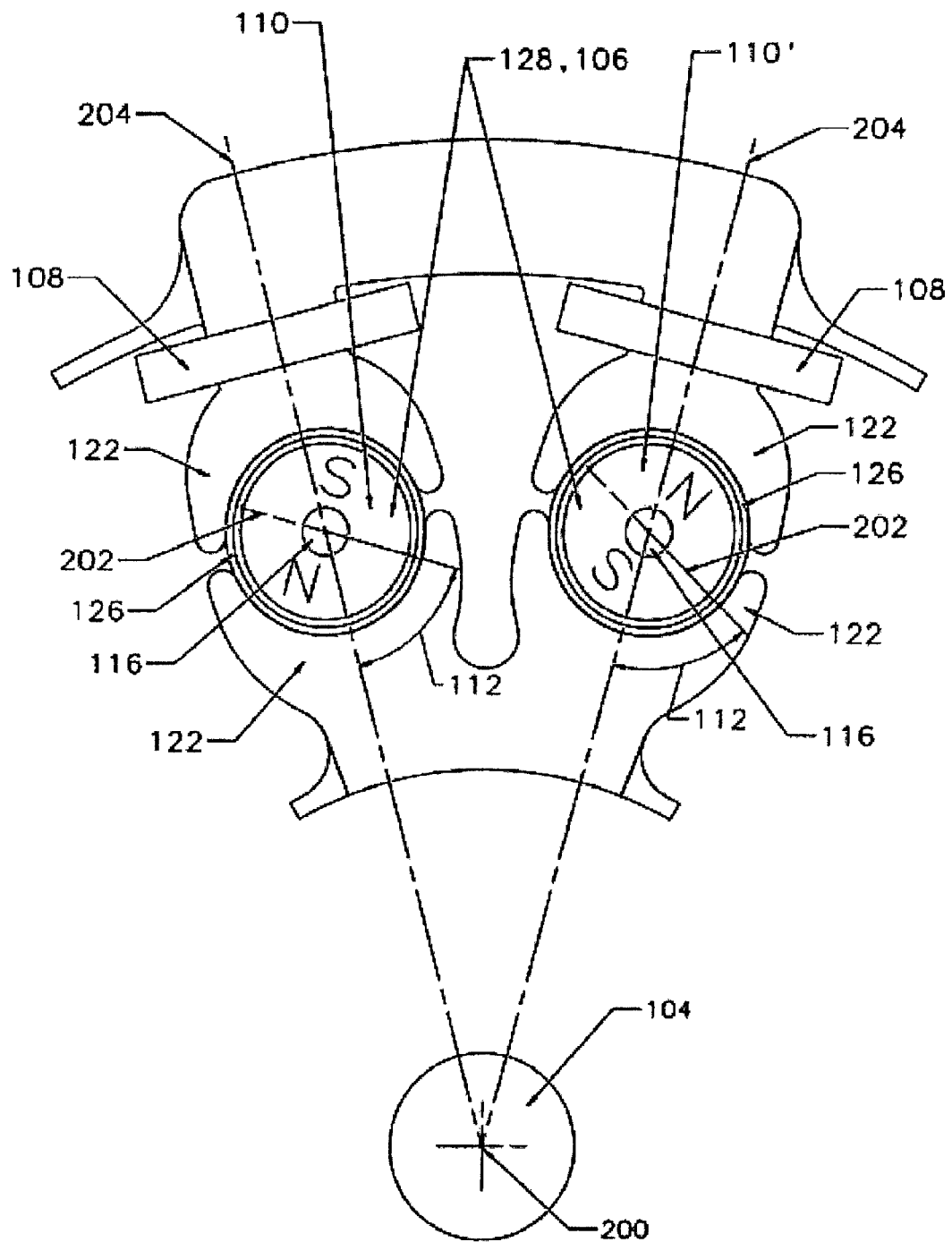
FIG. 6 is a schematic partial cut-away view of a portion of an embodiment of an electric machine in accordance with the disclosure, showing a pair of bi-pole rotors and associated structures.

As a particular example, it has been found that increases in magnetic path utility due to such pairing allow significant savings in weight and bulk, as compared to electric machines configured according to prior art principles. As will be understood by those skilled in the relevant arts, an increase in the diameter of an individual rotor magnet 128, and the corresponding increase in a magnet 128's surface area and the corresponding strength of the magnet's electromagnetic interaction with its corresponding winding(s) 108 can be utilized to increase the power provided by machine 100. However, to optimize this advantage, the cross-section of the corresponding stator 122 may be increased, in order to allow maintenance of the desired flux density. By pairing magnets 128 in rotor pairs 106, and employing shared stators 122, as shown in FIGS. 6 and 7, flux density may be maintained with a minimal weight penalty—which can be especially important in weight-critical applications such as aerospace and transportation.

By grouping rotors in 180-degree indexed pairs, the flux path length for each pair is minimized—in conventional 2-pole machines flux must travel 180 degrees around the rotor in order to link up with the opposite rotor magnet pole, and many winding slots must be provided (for a multiphase machine), which results in added stator weight. The use of configurations such as those described herein can avoid such problems.

Windings 108 may be provided in any configuration(s) suitable for use in accomplishing the purposes described herein. As will be readily understood by those skilled in the relevant arts, a wide variety of such configurations are known; doubtless others, which may maximize the efficiency of machines 100 according to the disclosure for various applications, will be hereafter developed. For example, single Litz wire or multiple strand windings 108 may be used in configuring either machine 100, individual rotors 102, rotor pairs 106, or other desired sets of rotors 102. The use of multiple windings 108 in a machine 100 can be used, as for example in conjunction with suitable mechanical indexing of the rotors 102 (as for example described herein) to fully or partially provide desired phasings in torque applied by rotors 102 to shaft 104. For example, 3-phase windings used in known electric machines may be formed by appropriate interconnections of the separate windings in machines 100 according to the disclosure.

Figure 7:
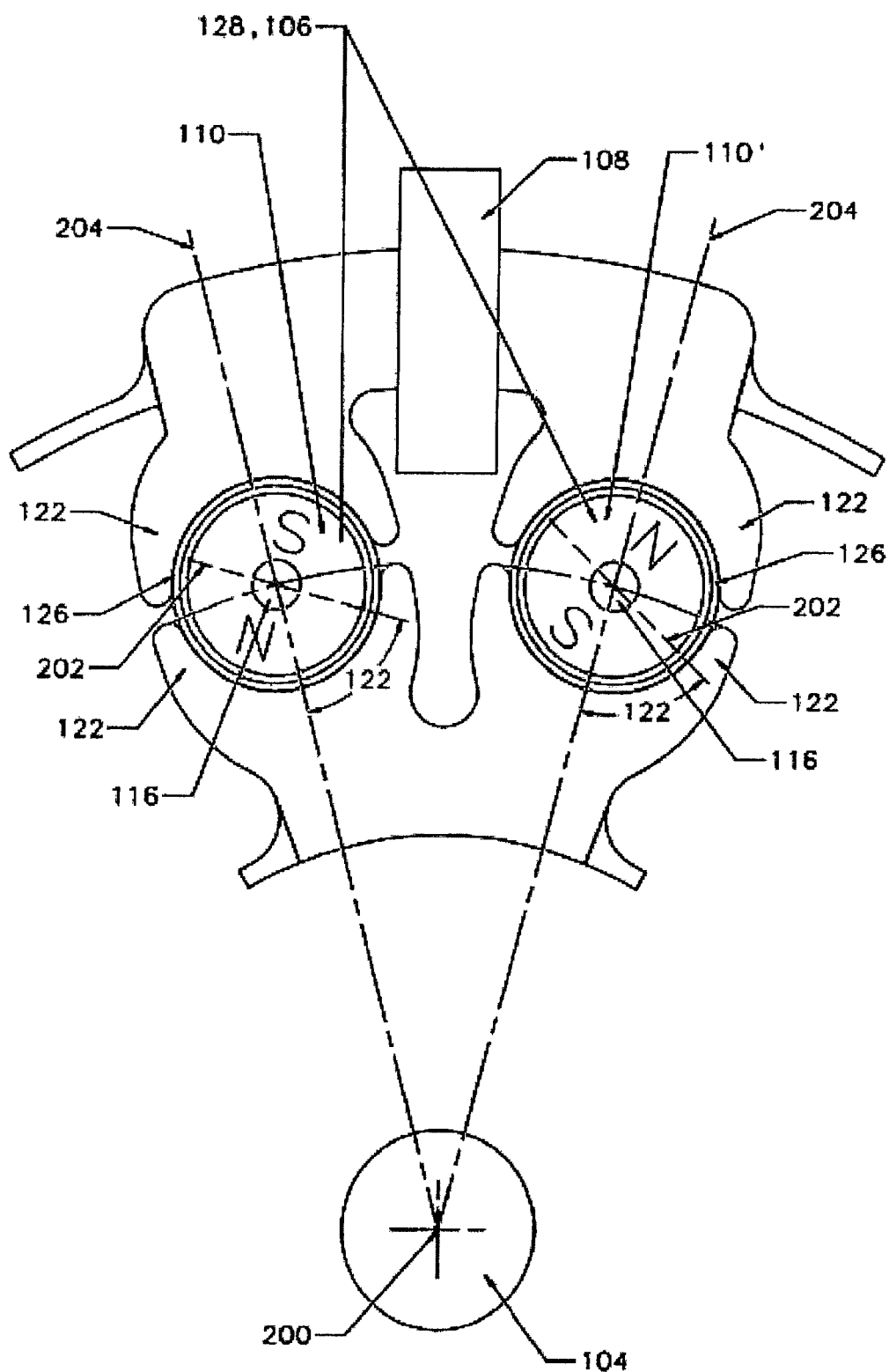
FIG. 7 is a schematic partial cut-away view of a portion of an embodiment of an electric machine in accordance with the disclosure, showing a pair of bi-pole rotors incorporating a single coil arrangement and associated structures.

As previously noted, it has been found advantageous, in some embodiments of the disclosure, to provide a single winding 108 for each pair of rotors 102, as shown for example in FIG. 7. It has been found, for example, that the use of single windings 108 for each rotor pair 102 can provide improved electrical and mechanical efficiency for the machine 100, as compared to machines in which multiple windings 108 are used.

An alternative embodiment, in which a single winding 108 is provided for each rotor 102, is shown in FIG. 6.

In further embodiments, as will be understood by those skilled in the relevant arts, multiple windings may be used, alone or in conjunction with mechanical indexing of the rotors 102, to provide multiple-phased power input to drive shaft 104. For example, as previously noted, 3-phase or other multiple-phase windings may be used.

As noted previously, the efficiency of machine 100 can be increased by suitable phasing of rotors 102 with respect to each other and with respect to winding(s) 108. In particular, the efficiency of machine 100 can be controlled by phasing rotors 102 with respect to each other and to winding(s) 108 in pairs. This can be accomplished, for example, by suitable gearing of rotors 102 with respect to each other and to motor shaft 104.

Figure 4:
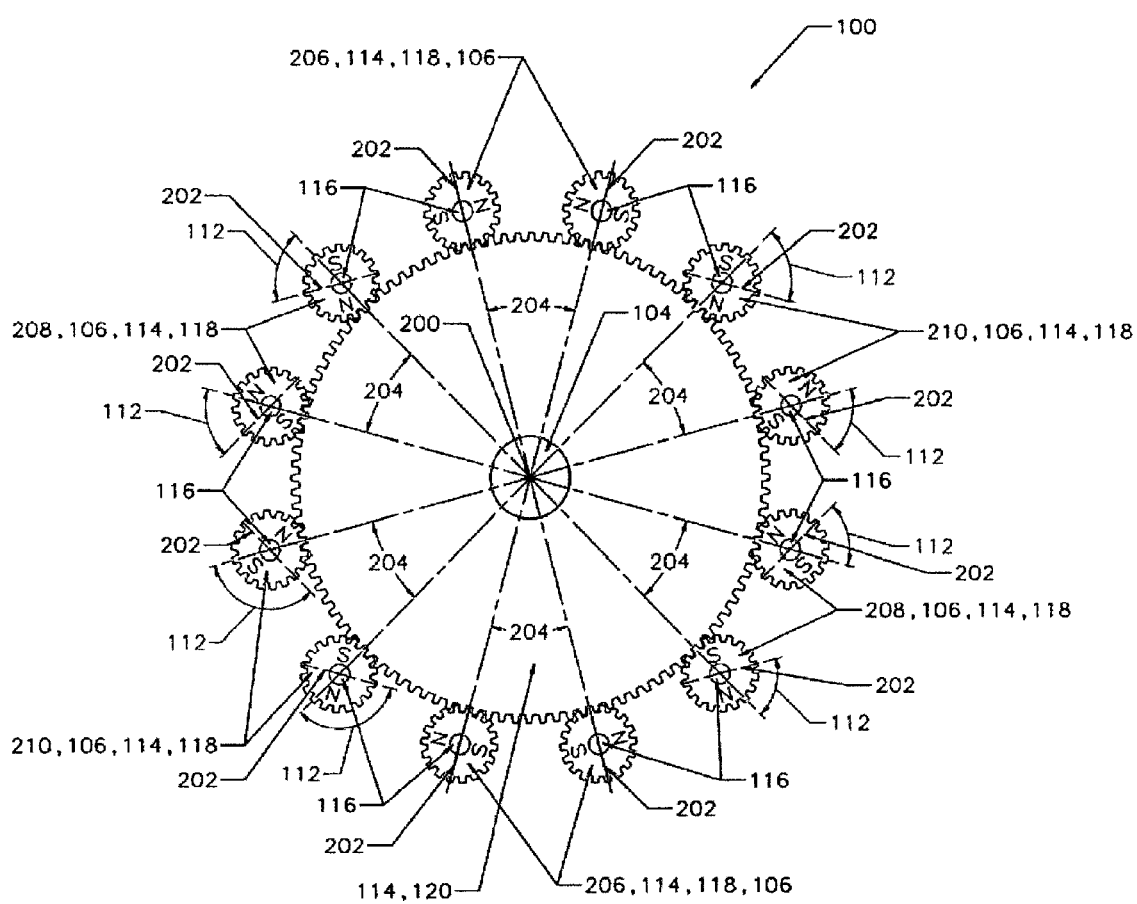
FIG. 4 is a schematic front cut-away view a portion of an embodiment of an electric machine in accordance with the disclosure.
Figure 5:
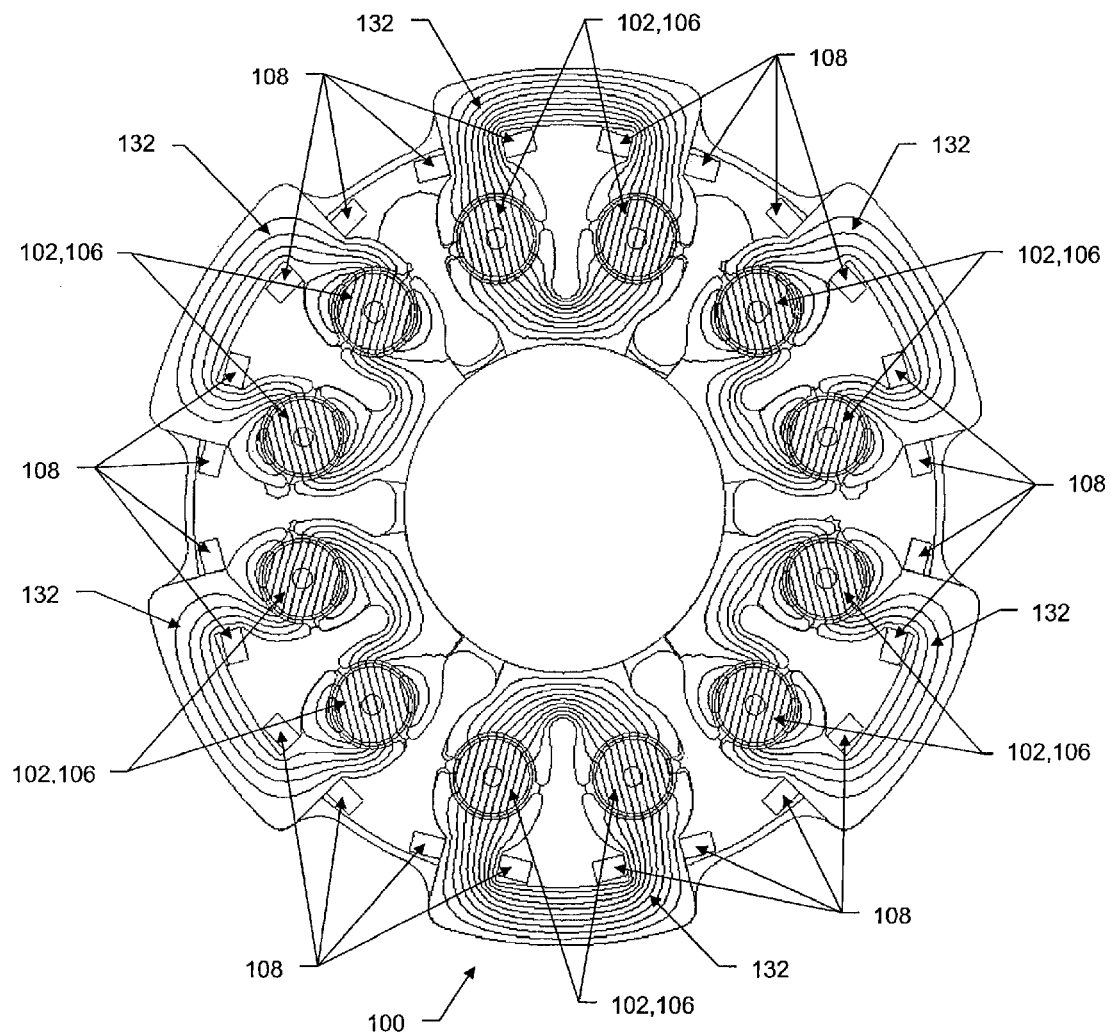
FIG. 5 is a schematic front partial cut-away view of a portion of an embodiment of an electric machine in accordance with the disclosure, showing representations of flux paths associated with a machine according to the disclosure while the machine is in operation.

In the illustrative gear arrangement shown in FIGS. 1 and 4, each rotor-driven gear 118 engages the periphery of central or ring gear 120; so that total torque applied to central gear 120 is the sum of the torques applied by the rotor gears. As will be readily understood by those skilled in the relevant arts, if winding(s) 108 are configured substantially circumferentially about axis 200 of shaft 104 and therefore machine 100, an index angle 112 may defined between equators 202 of individual magnets 128 and radii 204 extending from axis 200 to the corresponding rotor 102. By suitable arrangement of rotors 102 and/or gears 118, index angles 112 may be set at desired values for individual rotors, and sets thereof, with the result that phased torque output applied by each of the rotor pairs 106 can be applied to provide smooth, continuous, and very powerful torque to shaft 104, in the case of motor operation; or, in the case of generator operation, very smooth and continuous current output from overall winding(s) 108.

In the embodiment shown in FIGS. 1-7, a 12-rotor, 6-phase system is shown. As will be readily understood by those skilled in the relevant arts, the disclosure is readily adaptable to 6-rotor, 3 phase systems, 24-rotor, 12-phase systems, and other combinations.

In the case of the 12-rotor, 6-phase system shown in FIGS. 1-6, and in particular as shown in FIGS. 4 and 6, each of the 12 rotors 102 may be grouped into six rotor pairs 106. Within each rotor pair 106, a first rotor 102, 110 may be phased magnetically at 180 with respect to its mate 102, 110'. Further, each of the 6 rotor pairs 106 may phased at 60 degrees relative to its adjacent two rotor pairs. For example, equators 202 of $1^{st}$ and $4^{th}$ pairs 206 are aligned with their respective radii 204 from axis 200, while equators 202 of $2^{nd}$ and $5^{th}$ rotor pairs 208 are indexed by 60 degrees with respect to $1^{st}$ and $4^{th}$ pairs 206, and equators 202 of $3^{rd}$ and $6^{th}$ pairs 210 are indexed by 60 degrees with respect to $2^{nd}$ and $5^{th}$ pairs 208, and 120 degrees with respect to $1^{st}$ and $4^{th}$ pairs 206.

In a 6-rotor 3-phase system, each adjacent rotor pair 106 can be indexed by 120 degrees with respect to its neighbor pairs. In a 24-rotor 12-phase system, each adjacent pair 106 can be indexed by 30 degrees relative to its neighbor pairs.

As will be readily apparent to those skilled in the relevant arts, a wide variety of combinations and geometries of indexing and phasing are available, depending upon the desired input and output characteristics, and geometry, of the machine 100.

As will be further apparent to those skilled in the relevant arts, desired indexing of adjacent rotor pairs 106 can be accomplished mechanically, electrically, or in any suitable or desired combination thereof, as described herein.

As previously noted, in various embodiments the disclosure provides electric machines having a plurality of flux paths (i.e., magnetic circuits) defined between pairs of rotors, each pair of rotors being associated with a shared stator. Respective pairs of rotors may further be associated with a single winding, shared by the pair. Such machines may be configured such that the flux paths statically created, or located, within the machine (i.e. do not rotate about the stator) while the electric machine is in operation. Such embodiments are shown, for example, in FIGS. 5-7.

Any materials suitable for use in accomplishing the purposes described herein may be used in fabricating the various components of machine 100, including, for example, those used in fabricating analogous components of prior art electric machines. The selection of suitable materials will not trouble those skilled in the relevant arts.

As has already been noted, machine 100 may be operated as a motor by applying a suitable AC or commutated DC voltage across winding(s) 108, or as a generator by applying mechanical torque to shaft 104 and tapping current from leads suitably connected to winding(s) 108.

Electric machines in accordance with the disclosure can be operated, with appropriate rectifiers, solid state switches, capacitors, and other components, using either direct- or alternating-current input, or to provide either direct- or alternating-current output, depending upon whether electrical or mechanical input is applied to the winding(s) or common shaft, respectively.

Bi-pole rotors 102 of the type contemplated for use herein enable the electric machine 100 to be operated at relatively very high speeds. For example, the use of a 2 kHz drive frequency in winding(s) 108 can drive the permanent magnet rotors 102 at 120,000 RPM. As 20 Khz drives are currently widely available in the commercial markets, 2 kHz is well within the scope of implementation by those skilled in the relevant arts. Further, selection of suitable gear ratios between gears 114, e.g., drive gears 118 and shaft gear 120 (i.e, by selection of suitable gear radii) can enable control of the speed of rotation of shaft 104 when machine 100 is operated as a motor, by suitable control of input drive frequency.

Machines according to the disclosure can provide extremely high power densities. 10-inch diameter machine is capable of about 350 kW (470 HP) rating, and would have an electromagnetic weight of less than about 40 pounds. Use of previously-existing technology would provide, for that magnetic weight and output speed, about 100 HP (i.e., 20%).

The above descriptions are meant to be exemplary only, and one skilled in the art will recognize that changes may be made to the embodiments described without departing from the scope of the subject matter disclosed. Still other modifications which fall within the scope of the described subject matter will be apparent to those skilled in the art, in light of a review of this disclosure, and such modifications are intended to fall within the appended claims.

What is claimed is:

1. An electric motor comprising:
    a plurality of bi-pole magnetized rotors configured to drive a common shaft;

the bi-pole rotors provided in one or more multiples of six;

the plurality of rotors magnetically indexed in adjacent pairs with respect to one or more electrical windings, such that:

a separate magnetic circuit is defined for each pair of rotors;

each rotor of a respective pair is 180 degrees out of phase with its pair mate; and adjacent pairs of rotors are indexed relative to each other such that when a current is passed through the one or more windings, the rotors provide phased rotary power to the common shaft.

2. The motor of claim 1, wherein the plurality of rotors is configured to drive the common shaft by engaging one or more gears.

3. The motor of claim 1, wherein the pairs of rotors are indexed at uniform phasings.

4. The motor of claim 1, comprising for each respective indexed rotor pair a shared stator.

5. An electric generator comprising:

a plurality of bi-pole magnetized rotors configured to be driven by a common shaft;

the bi-pole rotors provided in one or more multiples of six;

the plurality of rotors magnetically indexed in adjacent pairs with respect to one or more electrical windings, such that:

a separate magnetic circuit is defined for each pair of rotors;

each rotor of a respective pair is 180 degrees out of phase with its pair mate; and adjacent pairs of rotors are indexed relative to each other such that when torque is applied to the common shaft, phased electric current is generated in the one or more windings.

6. The generator of claim 5, wherein the plurality of rotors is configured to be driven by the common shaft by engagement of the common shaft with one or more gears.

7. The generator of claim 5, wherein the pairs of rotors are indexed at uniform phasings.

8. The generator of claim 5, comprising for each respective indexed rotor pair a shared stator.

9. An electric motor comprising:

a plurality of bi-pole magnetized rotors configured to drive a common shaft;

the plurality of rotors magnetically indexed in pairs with respect to one or more electrical windings, such that a separate magnetic circuit is defined for each pair of rotors, and when a current is passed through the one or more windings, the rotors provide phased rotary power to the common shaft.

10. The motor of claim 9, wherein the plurality of rotors is configured to drive the common shaft by engaging one or more gears.

11. The motor of claim 9, comprising three indexed pairs of bi-pole rotors, each of the three rotor pairs phased at 120 degrees with respect to other pairs.

12. The motor of claim 9, comprising six indexed pairs of bi-pole rotors, each of the six rotor pairs phased at 60 degrees with respect to other pairs.

13. The motor of claim 9, wherein each rotor of a respective pair is 180 degrees out of phase with its pair mate.

14. The motor of claim 9, comprising for each respective indexed rotor pair a shared stator.

15. An electric generator comprising:

a plurality of bi-pole magnetized rotors configured to be driven by a common shaft;

the plurality of rotors magnetically indexed in pairs with respect to one or more electrical windings, such that a separate magnetic circuit is defined for each pair of rotors, and when torque is applied to the common shaft a phased current is generated in the one or more windings.

16. The generator of claim 15, wherein the plurality of rotors is configured to be driven by engagement of the common shaft by one or more gears.

17. The generator of claim 15, comprising three indexed pairs of bi-pole rotors, each of the three rotor pairs phased at 120 degrees with respect to other pairs.

18. The generator of claim 15, comprising six indexed pairs of bi-pole rotors, each of the six rotor pairs phased at 60 degrees with respect to other pairs.

19. The generator of claim 15, wherein each rotor of a respective pair is 180 degrees out of phase with its pair mate.

20. The generator of claim 15, comprising for each respective indexed rotor pair a shared stator.

* * * * *